(12) United States Patent
Yang et al.

(10) Patent No.: US 11,212,840 B2
(45) Date of Patent: Dec. 28, 2021

(54) METHOD FOR RANDOM ACCESS, TERMINAL, AND NETWORK DEVICE

(71) Applicant: GUANGDONG OPPO MOBILE TELECOMMUNICATIONS CORP., LTD., Guangdong (CN)

(72) Inventors: Ning Yang, Dongguan (CN); Jianhua Liu, Dongguan (CN)

(73) Assignee: SHENZHEN HEYTAP TECHNOLOGY CORP., LTD., Guangdong (CN)

( * ) Notice: Subject to any disclaimer, the term of this patent is extended or adjusted under 35 U.S.C. 154(b) by 161 days.

(21) Appl. No.: 16/496,257

(22) PCT Filed: Mar. 23, 2017

(86) PCT No.: PCT/CN2017/077943
§ 371 (c)(1),
(2) Date: Sep. 20, 2019

(87) PCT Pub. No.: WO2018/170861
PCT Pub. Date: Sep. 27, 2018

(65) Prior Publication Data
US 2020/0029368 A1    Jan. 23, 2020

(51) Int. Cl.
*H04W 74/08* (2009.01)
*H04W 88/04* (2009.01)
(Continued)

(52) U.S. Cl.
CPC ..... *H04W 74/0833* (2013.01); *H04W 56/001* (2013.01); *H04W 74/0891* (2013.01); *H04W 88/04* (2013.01); *H04W 92/18* (2013.01)

(58) Field of Classification Search
CPC . H04W 68/02; H04W 68/08; H04W 72/0446; H04W 72/1263; H04L 5/001; H04L 5/0092
See application file for complete search history.

(56) References Cited

U.S. PATENT DOCUMENTS

| 9,756,672 B2 | 9/2017 | Wu et al. |
| 2014/0198716 A1 | 7/2014 | Speight |

(Continued)

FOREIGN PATENT DOCUMENTS

| CN | 103024924 A | 4/2013 |
| CN | 103906266 A | 7/2014 |

(Continued)

OTHER PUBLICATIONS

Huawei et al.: "Paging and access" 3GPP Draft: R2-1701136, 3rd Generation Partnership Project (3GPP), MobileCompetence Centre: 650, Route Des Lucioles ; F-06921 Sophia-Antipolis Cedex France vol. RAN WG2, No. Athens, Greece; Feb. 13, 2017-Feb. 17, 2017 Feb. 12, 2017 (Feb. 12, 2017), XP051211847Retrieved from the Internet: URL: http://www.3gpp. org/ftp/Meetings 3GPP SYNC/ RAN2/Docs/[ retieved on Feb. 12, 2017]Sections 2.1, 2.2 *.
(Continued)

*Primary Examiner* — Iqbal Zaidi
(74) *Attorney, Agent, or Firm* — Ladas & Parry LLP

(57) ABSTRACT

Disclosed are a method for random access, a terminal, and a network device. The method comprises: a first terminal transmits a random access request to a network device; the first terminal receives a random access response transmitted by the network device; and the first terminal transmits uplink synchronization information and/or an uplink resource to the second terminal, the uplink synchronization information being used by the first terminal and/or the second terminal for uplink synchronization with the network device, and the uplink resource being used by the first terminal and/or the second terminal for communication with the network device. For embodiments of the present application, the first terminal requests the uplink synchronization information and/or the uplink resource from the network device, the uplink synchronization information is used by the first
(Continued)

terminal and/or the second terminal for uplink synchronization with the network device, and the uplink resource is used by the first terminal and/or the second terminal for communication with the network device. In other words, the first terminal can assist the second terminal in requesting the uplink synchronization information and/or the uplink resource from the network device, thus increasing the flexibility of a random access process for the first terminal and the second terminal in a relay scenario.

14 Claims, 7 Drawing Sheets

(51) Int. Cl.
  *H04W 56/00* (2009.01)
  *H04W 92/18* (2009.01)

(56) References Cited

U.S. PATENT DOCUMENTS

| | | |
|---|---|---|
| 2015/0312943 A1 | 10/2015 | Zhang et al. |
| 2015/0341974 A1 | 11/2015 | Wu et al. |
| 2016/0227479 A1 | 8/2016 | Ma |
| 2016/0227578 A1 | 8/2016 | Lee et al. |
| 2016/0366706 A1 | 12/2016 | Lee et al. |
| 2017/0064697 A1 | 3/2017 | Speight et al. |
| 2019/0075598 A1* | 3/2019 | Li .......... H04W 76/11 |
| 2019/0200344 A1 | 6/2019 | Speight et al. |
| 2019/0281523 A1* | 9/2019 | Lee .......... H04W 36/30 |

FOREIGN PATENT DOCUMENTS

| | | |
|---|---|---|
| CN | 104581834 A | 4/2015 |
| EP | 2745590 A1 | 6/2014 |
| RU | 2519920 C2 | 6/2014 |
| WO | 2011020211 A1 | 2/2011 |
| WO | 2016044855 A1 | 4/2013 |

OTHER PUBLICATIONS

Supplementary European Search Report in the European application No. 17901789.2, dated Jun. 9, 2020.
First Office Action of the Russian application No. 2019133736, dated Jul. 30, 2020.
First Office Action of the Indian application No. 201917042229, dated Jan. 27, 2021.
International Search Report in the interational application No. PCT/CN2017/077943, dated Dec. 6, 2017.
Written Opinion of the International Search Authority in the international application No. PCT/CN2017/077943, dated Dec. 6, 2017.
First Office Action of the Canadian application No. 3056825, dated Nov. 4, 2020.
Written Opinion of the Singaporean application No. 11201908611X, dated Nov. 30, 2020.

* cited by examiner

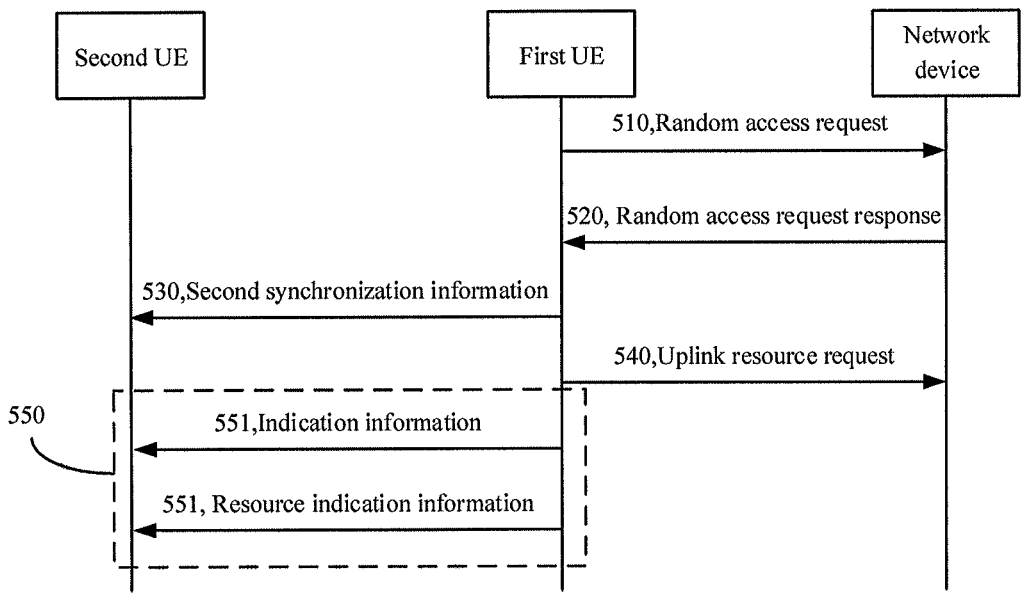

FIG. 5

A second UE receives uplink synchronization information and/or uplink resource sent by a first UE, the uplink synchronization information being configured for the first UE and/or the second UE to perform uplink synchronization with the network device, and the uplink resource being configured for the first UE and/or the second UE to communicate with the network device — 610

The second UE performs communication with the network device according to the uplink synchronization information — 620

FIG. 6 ical FIELD

METHOD FOR RANDOM ACCESS, TERMINAL, AND NETWORK DEVICE

CROSS-REFERENCE TO RELATED APPLICATION

The application is US national stage of the patent application No. PCT/CN2017/077943, entitled "METHOD FOR RANDOM ACCESS, TERMINAL, AND NETWORK DEVICE", filed on Mar. 23, 2017, the contents of which are hereby incorporated by reference in its entirety.

TECHNICAL FIELD

The disclosure relates to the field of communication, and more particularly to a random access method, a User Equipment (UE) and a network device.

BACKGROUND

In a present relay scenario, a relay UE and a remote UE, when accessing a network device (for example, an access network device), are required to initiate random access processes respectively to access the network device to obtain respective uplink synchronization information (for example, Timing Advance (TA)) and respective uplink resources. However, such a flow that the UE (including the remote UE and the relay UE) access the network device through the random access processes is relatively fixed and not so flexible.

SUMMARY

The disclosure provides a random access method, UE and a network device, to improve flexibility of a random access process of a UE (including remote UE and relay UE) in a relay scenario.

A first aspect provides a random access method, which may include that: a first UE sends a random access request to a network device; the first UE receives a random access response sent by the network device; and the first UE sends uplink synchronization information and/or an uplink resource to a second UE, the uplink synchronization information being used for the first UE and/or the second UE to perform uplink synchronization with the network device and the uplink resource being used for the first UE and/or the second UE to communicate with the network device.

According to embodiments of the disclosure, the first UE requests the network device for the uplink synchronization information and/or the uplink resource, the uplink synchronization information being used for the first UE and/or the second UE to perform uplink synchronization with the network device and the uplink resource being used for the first UE and/or the second UE to communicate with the network device, that is, the first UE may help the second UE to request the network device for the uplink synchronization information, so that flexibility of random access processes of the first UE and the second UE in a relay scenario is improved.

Furthermore, in the relay scenario, the first UE may help the second UE to acquire the uplink synchronization information and/or the uplink resource from the network device, so that the condition in a conventional art that the second UE is required to request the network device for the uplink synchronization information and/or the uplink resource through its own random access process is avoided, and signaling interactions for acquisition of the uplink synchronization information between the second UE and the network device are reduced to reduce a signaling overhead for acquisition of the uplink synchronization information between the second UE and the network device.

In combination with the first aspect, in a possible implementation mode of the first aspect, the uplink synchronization information may be configured for the second UE to perform uplink synchronization with the network device; the operation that the first UE receives the random access response sent by the network device may include that: the first UE receives the random access response sent by the network device, the random access response carrying first uplink synchronization information and the first uplink synchronization information being used for the first UE to perform uplink synchronization with the network device; and the operation that the first UE sends the uplink synchronization information and/or the uplink resource to the second UE may include that: the first UE determines the uplink synchronization information according to the first uplink synchronization information, and the first UE sends the uplink synchronization information to the second UE.

In combination with the first aspect, in a possible implementation mode of the first aspect, the uplink synchronization information may be configured for the first UE to perform uplink synchronization with the network device; and the operation that the first UE sends the uplink synchronization information and/or the uplink resource to the second UE according to the random access response may include that: the first UE sends the uplink synchronization information to the second UE to enable the second UE to perform uplink synchronization with the network device by using the uplink synchronization information.

In combination with the first aspect, in a possible implementation mode of the first aspect, the operation that the first UE sends the random access request to the network device may include that: the first UE sends the random access request to the network device, the random access request being used to request for the uplink resource for the first UE and/or the second UE; and the operation that the first UE receives the random access response sent by the network device may include that: the first UE receives the random access response sent by the network device, the random access response being used to indicate the uplink resource adopted by the first UE and/or the, second UE to communicate with the network device.

The uplink resource and the uplink synchronization information are applied for the second UE during the random access process of the first UE for the network device, so that the second UE may obtain the uplink synchronization information and the uplink resource more quickly.

In combination with the first aspect, in a possible implementation mode of the first aspect, the operation that the first UE sends the random access request to the network device, the random access request being used to request for the uplink resource for the first UE and/or the second UE, may include that: the first UE sends the random access request to the network device through a first physical random access resource, the random access request sent through the first physical random access resource being used to request for the uplink resource for the first UE and/or the second UE.

An effect of the random access request is classified in a resource division manner to achieve different effects through the same random access request format to reduce random access complexity of random access of the UE.

In combination with the first aspect, in a possible implementation mode of the first aspect, the method may further include that: the first UE sends resource request information to the network device, the resource request information being used to request for the uplink resource for the first UE and/or the second UE.

In combination with the first aspect, in a possible implementation mode of the first aspect, the operation that the first UE sends the resource request information to the network device may include that: the first UE sends a connection establishment request to the network device, the connection establishment request being used to request the network device to establish a connection with the first UE and the connection establishment request carrying the resource request information.

In combination with the first aspect, in a possible implementation mode of the first aspect, the operation that the first UE sends the resource request information to the network device may include that: the first UE sends connection establishment completion to the network device, connection establishment completion being used to indicate that connection establishment between the first UE and the network device has been completed and connection establishment request carrying the resource request information.

In combination with the first aspect, in a possible implementation mode of the first aspect, the operation that the first UE sends the resource request information to the network device may include that: the first UE sends reconfiguration completion to the network device, reconfiguration completion being used to indicate that resource reconfiguration between the first UE and the network device has been completed and reconfiguration completion carrying the resource request information.

In combination with the first aspect, in a possible implementation mode of the first aspect, the method may further include that: the first UE sends indication information to the second UE, the indication information being used to indicate the uplink resource adopted by the second UE to communicate with the network device.

In combination with the first aspect, in a possible implementation mode of the first aspect, the first UE may be relay UE and the second UE may be remote UE; or the first UE may be remote UE and the second UE may be relay UE.

In combination with the first aspect, in a possible implementation mode of the first aspect, the uplink synchronization information may include a TA adopted by the first UE and/or the second UE to communicate with the network device.

A second aspect provides a random access method, which may include that: second UE receives uplink synchronization information and/or uplink resource sent by a first UE, the uplink synchronization information being used for the first UE and/or the second UE to perform uplink synchronization with a network device and the uplink resource being used for the first UE and/or the second UE to communicate with the network device; and the second UE performs communication with the network device according to the uplink synchronization information and/or the uplink resource.

According to the embodiments of the disclosure, the first UE requests the network device for the uplink synchronization information and/or the uplink resource, the uplink synchronization information being used for the first UE and/or the second UE to perform uplink synchronization with the network device and the uplink resource being used for the first UE and/or the second UE to communicate with the network device, that is, the first UE may help the second UE to request the network device for the uplink synchronization information, so that flexibility of random access processes of the first UE and the second UE in a relay scenario is improved.

Furthermore, in the relay scenario, the first UE may help the second UE to acquire the uplink synchronization information and/or the uplink resource from the network device, so that the condition in a conventional art that the second UE is required to request the network device for the uplink synchronization information and/or the uplink resource through its own random access process is avoided, and signaling interactions for acquisition of the uplink synchronization information between the second UE and the network device are reduced to reduce a signaling overhead for acquisition of the uplink synchronization information between the second UE and the network device.

In combination with the second aspect, in a possible implementation mode of the second aspect, the method may further include that: the second UE receives indication information sent by the first UE, the indication information being used to indicate the uplink resource adopted by the second UE to communicate with the network device and the uplink resource indicated by the indication information being determined by the first UE through a random access process.

The uplink resource and the uplink synchronization information are applied for the second UE during the random access process of the first UE for the network device, so that the second UE may obtain the uplink synchronization information and the uplink resource more quickly.

In combination with the second aspect, in a possible implementation mode of the second aspect, the method may further include that: the second UE receives resource indication information sent by the network device, the resource indication information being used to indicate the uplink resource adopted by the second UE to communicate with the network device and the uplink resource indicated by the resource indication information being requested by the first UE through the random access process.

In combination with the second aspect, in a possible implementation mode of the second aspect, the first UE may be relay UE and the second UE may be remote UE; or the first UE may be remote UE and the second UE may be relay UE.

In combination with the second aspect, in a possible implementation mode of the second aspect, the uplink synchronization information may include a TA adopted by the first UE and/or the second UE to communicate with the network device.

A third aspect provides a random access method, which may include that: a network device receives a random access request sent by a first UE; and the network device sends a random access response to the first UE to enable the first UE to send uplink synchronization information and/or an uplink resource to a second UE, the uplink synchronization information being used for the first UE and/or the second UE to perform uplink synchronization with the network device and the uplink resource being used for the first UE and/or the second UE to communicate with the network device.

According to the embodiments of the disclosure, the first UE requests the network device for the uplink synchronization information and/or the uplink resource, the uplink synchronization information being used for the first UE and/or the second UE to perform uplink synchronization with the network device and the uplink resource being used for the first UE and/or the second UE to communicate with the network device, that is, the first UE may help the second UE to request the network device for the uplink synchronization information, so that flexibility of random access processes of the first UE and the second UE in a relay scenario is improved.

Furthermore, in the relay scenario, the first UE may help the second UE to acquire the uplink synchronization information and/or the uplink resource from the network device, so that the condition in a conventional art that the second UE is required to request the network device for the uplink synchronization information and/or the uplink resource through its own random access process is avoided, and signaling interactions for acquisition of the uplink synchronization information between the second UE and the network device are reduced to reduce a signaling overhead for acquisition of the uplink synchronization information between the second UE and the network device.

In combination with the third aspect, in a possible implementation mode of the third aspect, the uplink synchronization information may be configured for the second UE to perform uplink synchronization with the network device; the operation that the network device sends the random access response to the first UE may include that: the network device sends the random access response to the first UE, the random access response carrying first uplink synchronization information and the first uplink synchronization information being used for the first UE to perform uplink synchronization with the network device, to enable the first UE to determine the uplink synchronization information according to the first uplink synchronization information.

In combination with the third aspect, in a possible implementation mode of the third aspect, the operation that the network device receives the random access request sent by the first UE may include that: the network device receives the random access request sent by the first UE, the random access request being used to request for the uplink resource for the first UE and/or the second UE; and the operation that the network device sends the random access response to the first UE may include that: the network device sends the random access response to the first UE, the random access response being used to indicate the uplink resource adopted by the first UE and/or the second UE to communicate with the network device.

The uplink resource and the uplink synchronization information are applied for the second UE during the random access process of the first UE for the network device, so that the second UE may obtain the uplink synchronization information and the uplink resource more quickly.

In combination with the third aspect, in a possible implementation mode of the third aspect, the operation that the network device receives the random access request sent by the first UE, the random access request being used to request for the uplink resource for the first UE and/or the second UE, may include that: the network device receives the random access request sent by the UE through a first physical random access resource, the random access request sent through the first physical random access resource being used to request for the uplink resource for the first UE and/or the second UE.

An effect of the random access request is classified in a resource division manner to achieve different effects through the same random access request format to reduce random access complexity of random access of the UE.

In combination with the third aspect, in a possible implementation mode of the third aspect, the method may further include that: the network device receives resource request information sent by the first UE, the resource request information being used to request for the uplink resource for the first UE and/or the second UE.

In combination with the third aspect, in a possible implementation mode of the third aspect, the operation that the network device receives the resource request information sent by the first UE may include that: the network device receives a connection establishment request sent by the first UE, the connection establishment request being used to request the network device to establish a connection with the first UE and the connection establishment request carrying the resource request information.

In combination with the third aspect, in a possible implementation mode of the third aspect, the operation that the network device receives the resource request information sent by the first UE may include that: the network device receives connection establishment completion sent by the first UE, connection establishment completion being used to indicate that connection establishment between the first UE and the network device has been completed and connection establishment request carrying the resource request information.

In combination with the third aspect, in a possible implementation mode of the third aspect, the operation that the network device receives the resource request information sent by the first UE may include that: the network device receives reconfiguration completion sent by the first UE, reconfiguration completion being used to indicate that reconfiguration between the first UE and the network device has been completed and reconfiguration completion carrying the resource request information.

In combination with the third aspect, in a possible implementation mode of the third aspect, the random access request may be configured to request for the uplink resource for the second UE, and the method may further include that: the network device sends resource indication information to the second UE, the indication information being used to indicate the uplink resource adopted by the second UE to communicate with the network device.

In combination with the third aspect, in a possible implementation mode of the third aspect, the first UE may be relay UE and the second UE may be remote UE; or the first UE may be remote UE and the second UE may be relay UE.

In combination with the second aspect, in a possible implementation mode of the third aspect, the uplink synchronization information may include a TA adopted by the first UE and/or the second UE to communicate with the network device.

A fourth aspect provides UE, which includes modules configured to execute the method in the first aspect.

A fifth aspect provides UE, which includes modules configured to execute the method in the second aspect.

A sixth aspect provides a network device, which includes units configured to execute the method in the third aspect.

A seventh aspect provides UE, which includes a processor and a transceiver. The processor executes the method of the first aspect through the transceiver.

An eighth aspect provides UE, which includes a processor and a transceiver. The processor executes the method of the second aspect through the transceiver.

A ninth aspect provides a network device, which includes a processor and a transceiver. The processor executes the method of the third aspect through the transceiver.

A tenth aspect provides a computer-readable medium, which stores a program code configured to be executed by a terminal device, the program code including an instruction configured to execute the method in the first aspect.

An eleventh aspect provides a computer-readable medium, which stores a program code configured to be executed by a terminal device, the program code including an instruction configured to execute the method in the second aspect.

A twelfth aspect provides a computer-readable medium, which stores a program code configured to be executed by a terminal device, the program code including an instruction configured to execute the method in the third aspect.

A thirteenth aspect provides a computer program product including an instruction, which runs on a computer to enable the computer to execute the method in each aspect.

BRIEF DESCRIPTION OF DRAWINGS

FIG. 5 is a schematic flowchart of a random access method according to an embodiment of the disclosure.

FIG. 6 is a schematic flowchart of a random access method according to an embodiment of the disclosure.

DETAILED DESCRIPTION

The technical solutions in the disclosure will be described below in combination with the drawings.

Figure 1:
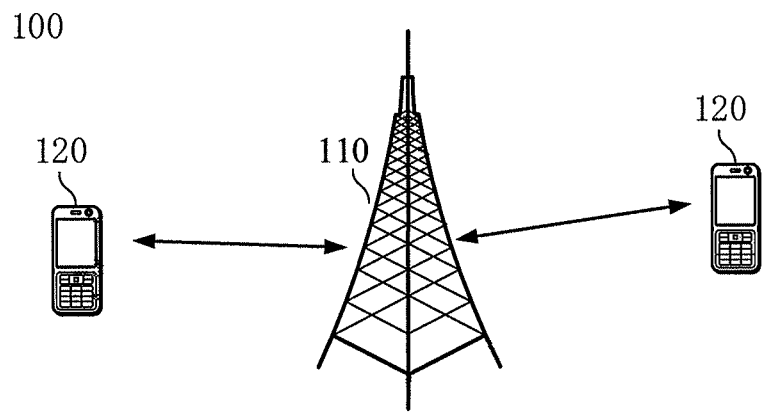
FIG. 1 is a wireless communication system 100 to which the embodiments of the disclosure are applied.

FIG. 1 is a wireless communication system 100 to which the embodiments of the disclosure are applied. The wireless communication system 100 may include a network device 110. The network device 110 may be a device communicating with a terminal device. The network device 110 may provide communication coverage for a specific geographical region and may communicate with a terminal device located in the coverage.

A network device and two terminals are exemplarily shown in FIG. 1. Optionally, the wireless communication system 100 may include multiple network devices and another number of terminals may be included in coverage of each network device. There are no limits made thereto in the embodiments of the disclosure.

Optionally, the wireless communication system 100 may further include another network entity such as a network controller and a mobility management entity. There are no limits made thereto in the embodiments of the disclosure.

It is to be understood that the technical solutions of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a Universal Mobile Telecommunication System (UMTS), New Radio Access Technology (NR), and 5th-Generation (5G).

It is also to be understood that, in the embodiments of the disclosure, the terminal device may include, but not limited to, a Mobile Station (MS), a mobile terminal, a mobile telephone, UE, a handset, portable equipment and the like. The terminal device may communicate with one or more core networks through a Radio Access Network (RAN). For example, the terminal device may be a mobile phone (or called a "cell" phone), a computer with a wireless communication function and the like. The terminal device may also be a portable, pocket, handheld, computer-embedded or vehicle-mounted mobile device.

In the embodiments of the disclosure, the network device may be an access network device and, for example, may be a base station, a Transmit and Receive Point (TRP) or an access point. The base station may be a Base Transceiver Station (BTS) in the GSM or CDMA, may also be a NodeB in WCDMA, may also be an Evolved Node B (eNB or e-NodeB) in LTE and may further be a gNB in NR or 5G. There are no specific limits made thereto in the embodiments of the disclosure.

Figure 2:
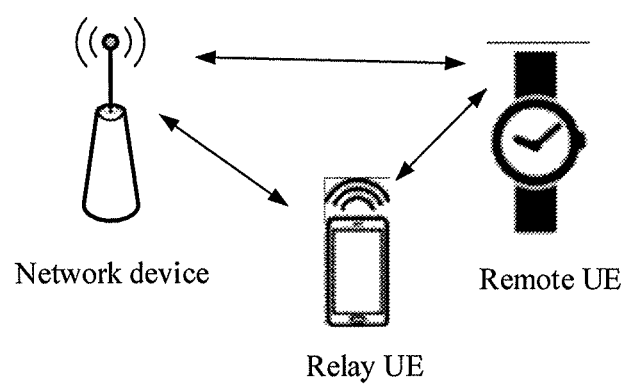
FIG. 2 is a schematic diagram of a relay scenario according to an embodiment of the disclosure.

FIG. 2 is a schematic diagram of a relay scenario according to an embodiment of the disclosure. In the relay scenario shown in FIG. 2, remote UE may be a wearable device, and relay UE may be a device such as a mobile phone and a computer. If the remote UE is out of coverage of a network device, the remote UE may communicate with the network device through the relay UE. When the remote UE is within the coverage of the network device, the remote UE may directly communicate with the network device. The remote UE may perform Device-to-Device (D2D) communication with the relay UE, and the remote UE forms an association relationship with the relay UE.

In an existing relay scenario, the focus is how the relay UE and the remote UE access the network device through random access processes when the relay UE is relatively far away from the remote UE, and thus the relay UE and the remote UE are required to initiate the random access processes respectively to access the network device to obtain respective uplink synchronization information (for example, TA) and respective uplink resources at present.

However, along with development of wearable devices, the relay UE is usually relatively close to the remote UE. For example, when the remote UE is a wearable device and the relay UE is a mobile phone, both the remote UE and the relay UE are carried with a user. In such a relay scenario where the remote UE is relatively close to the relay UE, network devices accessed by the remote UE and the relay UE are usually the same network device, and during cell handover, target network devices for handover of the remote UE and the relay UE are usually also the same network device, and uplink synchronization information (for example, TA) acquired by the remote UE and the relay UE from the network device may be relatively close and even the same. Therefore, in the relay scenario where the remote UE is relatively close to the relay UE, if the remote UE and the relay UE further access the network device through the existing random access processes, unnecessary signaling overhead may be brought.

Figure 3:
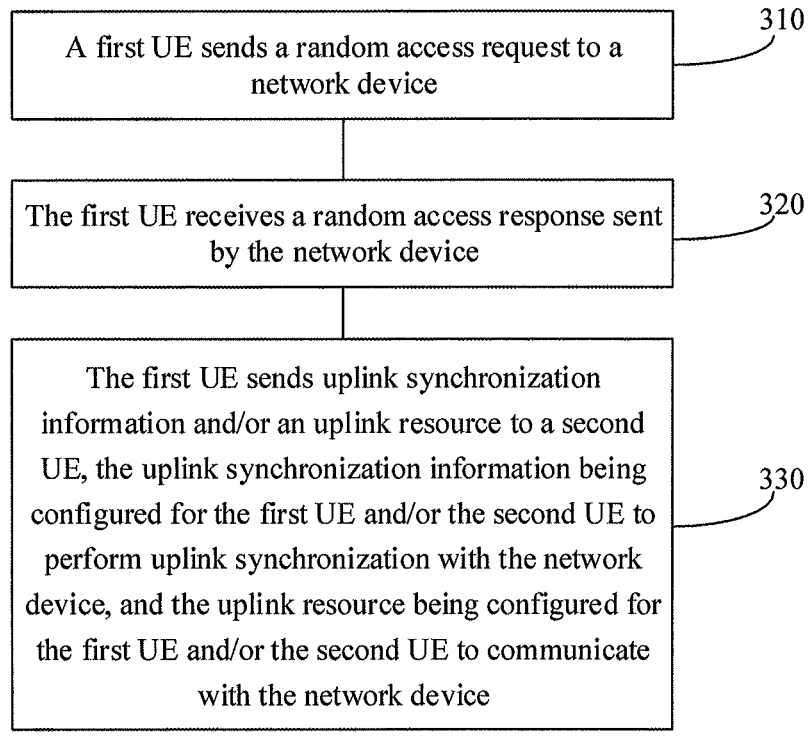
FIG. 3 is a schematic flowchart of a random access method according to an embodiment of the disclosure.

For reducing the unnecessary signaling overhead caused by the fact that the remote UE and the relay UE further access the network device through the existing random access processes in the relay scenario where the remote UE is relatively close to the relay UE, the embodiments of the disclosure disclose a random access method, to reduce the signaling overhead caused by the fact that the remote UE and the relay UE further access the network device through the random access processes in the relay scenario where the remote UE is relatively close to the relay UE, The random access method of the embodiments of the disclosure will be described below in combination with FIG. 3 in detail.

FIG. 3 is a schematic flowchart of a random access method according to an embodiment of the disclosure. The method shown in FIG. 2 includes the following operations.

In S310, first UE sends a random access request to a network device.

In S320, the first UE receives a random access response sent by the network device.

In S330, the first UE sends uplink synchronization information and/or an uplink resource to a second UE, the uplink synchronization information being used for the first UE and/or the second UE to perform uplink synchronization with the network device and the uplink resource being used for the first UE and/or the second UE to communicate with the network device.

Specifically, the random access response may contain the uplink synchronization information for uplink synchronization of the first UE and/or the second UE and the network device, and the random access response may further indicate the uplink resource for communication of the first UE and/or the second UE and the network device.

That the uplink synchronization information is configured for uplink synchronization of the first UE and the network device may refer to the first UE sends the uplink synchronization information for synchronization of the first UE and the network device to the second UE to enable the second UE to communicate with the network device directly by using the uplink synchronization information of the first UE or enable the second UE to estimate uplink synchronization information of the second UE according to the uplink synchronization information of the first UE.

That the uplink synchronization information is configured for the first UE and/or the second UE to perform uplink synchronization with the network device may refer to that the uplink synchronization information is shared by the first UE and the second UE and the second UE may communicate with the network device by using the uplink synchronization information.

That the uplink synchronization information is configured for uplink synchronization of the second UE and the network device may refer to that the first UE estimates the uplink synchronization information for synchronization of the second UE and the network device according to the uplink synchronization information for uplink synchronization of the first UE and the network device or the network device may directly send the uplink synchronization information of the second UE and the network device to the first UE for the first UE to forward to the second UE.

It is to be understood that the first UE may be relay UE and the second UE may be remote UE or the first UE is a remote UE and the second UE is a relay UE.

It is also to be understood that the first UE may communicate with the second UE through a D2D technology.

It is to be noted that, for convenient description, the uplink synchronization information for uplink synchronization of the first UE and the network device is called first uplink synchronization information, the uplink synchronization information for uplink synchronization of the second UE and the network device is called second uplink synchronization information and, in such case, that the first UE and/or the second UE estimate/estimates the second uplink synchronization information according to the first uplink synchronization information may refer to that the first UE may determine the second synchronization information according to a distance between the second UE and the first UE and the first UE may also determine the second synchronization information according to signal strength for communication of the second UE and the first UE, or the second UE may determine the second synchronization information according to the distance between the second UE and the first UE and the second UE may also determine the second synchronization information according to the signal strength for communication of the second UE and the first UE. A specific manner for determining the second synchronization information is not limited in the embodiment of the disclosure.

According to the embodiment of the disclosure, the first UE requests the network device for the uplink synchronization information and/or the uplink resource to a second UE, the uplink synchronization information being used for the first UE and/or the second UE to perform uplink synchronization with the network device and the uplink resource being used for the first UE and/or the second UE to communicate with the network device. That is, the first UE may help the second UE to request the network device for the uplink synchronization information and/or the uplink resource, so that flexibility of random access processes of the first UE and the second UE in a relay scenario is improved.

Furthermore, in the relay scenario, the first UE may help the second UE to acquire the uplink synchronization information and/or the uplink resource from the network device, so that the condition in a conventional art that the second UE is required to request the network device for the uplink synchronization information and/or the uplink resource through its own random access process is avoided, and signaling interactions for acquisition of the uplink synchronization information and/or the uplink resource between the second UE and the network device are reduced to reduce a signaling overhead for acquisition of the uplink synchronization information between the second UE and the network device.

Optionally, as an embodiment, the uplink synchronization information is configured for the second UE to perform uplink synchronization with the network device; S320 includes that: the first UE receives the random access response sent by the network device, the random access response carrying first uplink synchronization information and the first uplink synchronization information being used for the first UE to perform uplink synchronization with the network device; and S330 includes that: the first UE determines the uplink synchronization information according to the first uplink synchronization information, and the first UE sends the uplink synchronization information to the second UE.

Specifically, that the first UE determines the uplink synchronization information according to the first uplink synchronization information in the random access response may refer to that the first UE estimates the uplink synchronization information for uplink synchronization of the second UE and the network device according to the first uplink synchronization information in the random access response.

Optionally, as an embodiment, the uplink synchronization information is configured for the first UE to perform uplink synchronization with the network device, and S320 includes that: the first UE sends the uplink synchronization information to the second UE to enable the second UE to perform uplink synchronization with the network device by using the uplink synchronization information.

Specifically, the first UE may forward the uplink synchronization information to the second UE, and the second UE may perform uplink synchronization with the network device directly by using the uplink synchronization information for uplink synchronization of the first UE and the network device.

Optionally, as an embodiment, S310 includes that: the first UE sends the random access request to the network device, the random access request being used to request for the uplink resource for the first UE and/or the second UE; and S320 includes that: the first UE receives the random access response sent by the network device, the random access response being used to indicate the uplink resource adopted by the first UE and/or the second UE to communicate with the network device.

It is to be understood that an Identifier (ID) of the second UE may be contained in the random access request sent to the network device by the first UE to indicate that the random access request is further configured to request for the uplink resource for the second UE. There are no specific limits made thereto in the embodiment of the disclosure.

It is also to be understood that the uplink resource for communication of the second UE and the network device may be sent to the second UE through the first UE, and may also be directly sent to the second UE through the network device. There are no specific limits made thereto in the embodiment of the disclosure.

Optionally, as an embodiment, the operation that the first UE sends the random access request to the network device, the random access request being used to request for the uplink resource for the first UE and/or the second UE, includes that: the first UE sends the random access request to the network device through a first physical random access resource, the random access request sent through the first physical random access resource being used to request for the uplink resource for the first UE and/or the second UE.

Specifically, a physical random access resource may be regionally divided, and random access requests sent through different physical random access resources may represent different meanings. For example, the physical random access resource is divided into two different regions, i.e., a first region and a second region, a random access request sent through the first region may be configured to request for the uplink resource for the first UE, and a random access request sent through the second region may be configured to request for the uplink resource for the second UE.

It is to be understood that the first physical random access resource may refer to a Physical Random Access Channel (PRACH).

Optionally, as an embodiment, the method further includes that: the first UE sends resource request information to the network device, the resource request information being used to request for the uplink resource for the first UE and/or the second UE.

It is to be noted that the resource request information may be born in signaling for communication of the first UE and the network device, and the resource request information may further be independently sent to the network device by the first UE. A specific manner for sending the resource request information is not limited in the embodiment of the disclosure.

It is also to be understood that the uplink resource for communication of the second UE and the network device may be sent to the second UE through the first UE, and may also be directly sent to the second UE through the network device. There are no specific limits made thereto in the embodiment of the disclosure.

Optionally, as an embodiment, the operation that the first UE sends the resource request information to the network device includes that: the first UE sends a connection establishment request to the network device, the connection establishment request being used to request the network device to establish a connection with the first UE and the connection establishment request carrying the resource request information.

Specifically, the first UE may request the network device for the uplink resource for the second UE through the resource request information in the connection establishment request.

It is to be understood that the connection establishment request may be a Radio Resource Control (RRC) connection establishment request in an LTE communication system or another connection establishment request with an effect the same as that of the RRC connection establishment request in a future communication system.

Optionally, as an embodiment, the operation that the first UE sends the resource request information to the network device includes that: the first UE sends connection establishment completion to the network device, connection establishment completion being used to indicate that connection establishment between the first UE and the network device has been completed and connection establishment completion carrying the resource request information.

Specifically, the first UE may request the network device for the uplink resource for the second UE through the resource request information in connection establishment completion.

It is to be understood that connection establishment completion may be RRC connection establishment completion in the LTE communication system or other information with an effect the same as that of RRC connection establishment completion in the future communication system.

Optionally, as an embodiment, the operation that the first UE sends the resource request information to the network device includes that: the first UE sends reconfiguration completion to the network device, reconfiguration completion being used to indicate that resource reconfiguration between the first UE and the network device has been completed and reconfiguration completion carrying the resource request information.

Specifically, the first UE may request the network device for the uplink resource for the second UE through the resource request information in reconfiguration completion.

It is to be understood that reconfiguration completion may be RRC reconfiguration completion in the LTE communication system or other information with an effect the same as that of RRC reconfiguration completion in the future communication system.

Optionally, as an embodiment, the method further includes that: the first UE sends indication information to the second UE, the indication information being used to indicate the uplink resource adopted by the second UE to communicate with the network device.

Optionally, as an embodiment, the uplink synchronization information includes a TA adopted by the first UE and/or the second UE to communicate with the network device.

Figure 4:
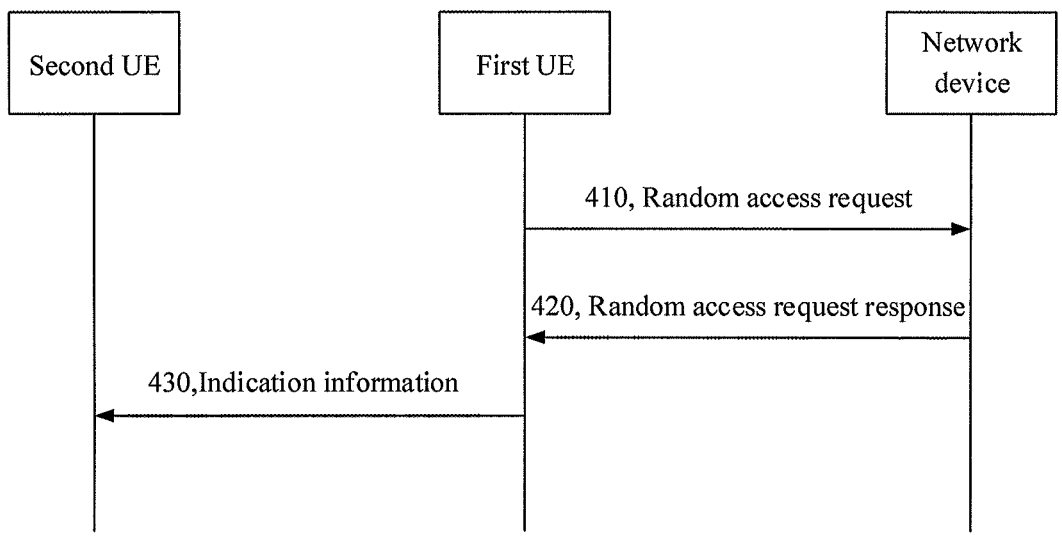
FIG. 4 is a schematic flowchart of a random access method according to an embodiment of the disclosure.

The random access method of the embodiments of the disclosure will be described below in combination with specific examples. It is to be understood that the methods shown in FIG. 4 and FIG. 5 are adopted not to limit the embodiments of the disclosure to exemplified specific scenarios but only to help those skilled in the art to understand the embodiments of the disclosure. It is apparent that those skilled in the art may make various equivalent variations or modifications according to the example shown in FIG. 4 or FIG. 5, and these variations and modifications also fall within the scope of the embodiments of the disclosure.

FIG. 4 is a schematic flowchart of a random access method according to an embodiment of the disclosure. The method shown in FIG. 4 includes the following operations.

In S410, first UE sends a random access request to a network device, the random access request being used to request for uplink resources for the first UE and second UE.

In S420, the network device sends a random access request response to the first UE, the random access response carrying the uplink resource for communication of the second UE and the network device.

In S430, the first UE sends indication information to the second UE, the indication information being used to indicate uplink synchronization information for the first UE and/or the second UE to perform synchronization with the network device and the uplink synchronization resource for communication of the second UE and the network device.

FIG. 5 is a schematic flowchart of a random access method according to an embodiment of the disclosure. The method shown in FIG. 5 includes the following operations.

In S510, first UE sends a random access request to a network device.

Specifically, the random access request is configured to request for uplink synchronization information and an uplink resource for the first UE, and may also be understood to have an effect the same as that of a random access request in an existing communication system.

In S520, the network device sends a random access request response to the first UE.

In S530, the first UE sends uplink synchronization information to a second UE, the synchronization information being used for the first UE and/or the second UE to perform synchronization with the network device, for example, a TA value.

In S540, the first UE sends an uplink resource request to the network device, the uplink resource request being used to request for an uplink resource for the second UE.

It is to be noted that uplink resource request information may be born in signaling for communication of the first UE and the network device, and the resource request information may further be independently sent to the network device by the first UE.

In S550, the second UE acquires the uplink resource for communication with the network device.

Specifically, the second UE may acquire the uplink resource for communication with the network device in the following two manners.

In S551, the first UE sends indication information to the second UE, the indication information being used to instruct the second UE to acquire the uplink resource for communication with the network device.

In S552, the network device sends resource indication information to the second UE, the resource indication information being used to instruct the second UE to acquire the uplink resource for communication with the network device.

The random access method of the embodiments of the disclosure is described above from the angle of the first UE in detail, and the embodiments of the disclosure will be described below from the angle of the second UE and the network device. It is to be understood that, for simplicity, implementation details about the following methods may refer to the above descriptions and will not be elaborated herein.

FIG. 6 is a schematic flowchart of a random access method according to an embodiment of the disclosure. The method shown in FIG. 6 includes the following operations.

In S610, second UE receives uplink synchronization information and/or uplink resource sent by a first UE, the uplink synchronization information being used for the first UE and/or the second UE to perform uplink synchronization with a network device and the uplink resource being used for the first UE and/or the second UE to communicate with the network device.

In S620, the second UE performs communication with the network device according to the uplink synchronization information and/or the uplink resource.

Specifically, that the second UE performs communication with the network device according to the uplink synchronization information may refer to that the second UE directly performs uplink synchronization with the network device according to the uplink synchronization information, and may also refer to that the second UE directly determines the uplink synchronization information for uplink synchronization of the second UE and the network device according to the uplink synchronization information.

It is to be noted that the uplink synchronization information for uplink synchronization of the second UE and the network device may be estimated by the first UE according to the uplink synchronization information for uplink synchronization of the first UE and the network device, may also be uplink synchronization information directly sent to the first UE by the network device and configured for uplink synchronization of the second UE and the network device, and may further be estimated by the second UE according to the uplink synchronization information sent by the first UE and configured for uplink synchronization of the first UE and the network device.

According to the embodiment of the disclosure, the first UE requests the network device for the uplink synchronization information and/or the uplink resource to a second UE, the uplink synchronization information being used for the first UE and/or the second UE to perform uplink synchronization with the network device and the uplink resource being used for the first UE and/or the second UE to communicate with the network device. That is, the first UE may help the second UE to request the network device for the uplink synchronization information and/or the uplink resource, so that flexibility of random access processes of the first UE and the second UE in a relay scenario is improved.

Furthermore, in the relay scenario, the first UE may help the second UE to acquire the uplink synchronization information and/or the uplink resource from the network device, so that the condition in a conventional art that the second UE is required to request the network device for the uplink synchronization information and/or the uplink resource through its own random access process is avoided, and signaling interactions for acquisition of the uplink synchronization information and/or the uplink resource between the second UE and the network device are reduced to reduce a signaling overhead for acquisition of the uplink synchronization information between the second UE and the network device.

Optionally, as an embodiment, the method further includes that: the second UE receives indication information sent by the first UE, the indication information being used to indicate the uplink resource adopted by the second UE to communicate with the network device and the uplink resource indicated by the indication information being determined by the first UE through a random access process.

Optionally, as an embodiment, the method further includes that: the second UE receives resource indication information sent by the network device, the resource indication information being used to indicate the uplink resource adopted by the second UE to communicate with the network device and the uplink resource indicated by the resource indication information being requested by the first UE through a random access process.

Optionally, as an embodiment, the operation that the second UE performs communication with the network device by using second uplink synchronization information includes that: the second UE performs communication with the network device by using the uplink resource and the uplink synchronization information.

Optionally, as an embodiment, the first UE is a relay UE and the second UE is a remote UE; or the first UE is a remote UE and the second UE is a relay UE.

Optionally, as an embodiment, the uplink synchronization information includes a TA adopted by the first UE and/or the second UE to communicate with the network device.

Figure 7:
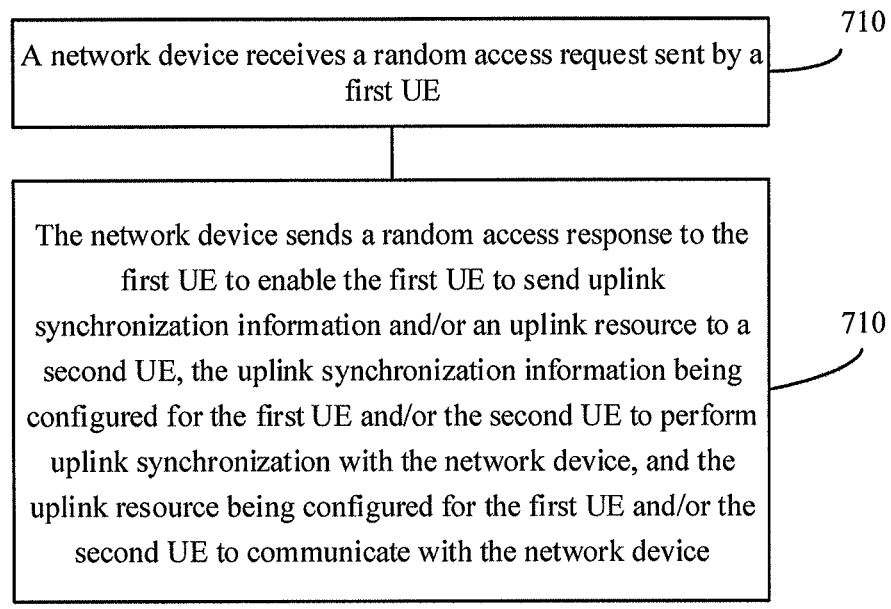
FIG. 7 is a schematic flowchart of a random access method according to an embodiment of the disclosure.

FIG. 7 is a schematic flowchart of a random access method according to an embodiment of the disclosure. The method shown in FIG. 7 includes the following operations.

In S710, a network device receives a random access request sent by a first UE.

In S720, the network device sends a random access response to the first UE to enable the first UE to send synchronization information and/or an uplink resource to a second UE, the uplink synchronization information being used for the first UE and/or the second UE to perform uplink synchronization with the network device and the uplink resource being used for the first UE and/or the second UE to communicate with the network device.

According to the embodiment of the disclosure, the first UE requests the network device for the uplink synchronization information and/or the uplink resource to a second UE, the uplink synchronization information being used for the first UE and/or the second UE to perform uplink synchronization with the network device and the uplink resource being used for the first UE and/or the second UE to communicate with the network device. That is, the first UE may help the second UE to request the network device for the uplink synchronization information and/or the uplink resource, so that flexibility of random access processes of the first UE and the second UE in a relay scenario is improved.

Furthermore, in the relay scenario, the first UE may help the second UE to acquire the uplink synchronization information and/or the uplink resource from the network device, so that the condition in a conventional art that the second UE is required to request the network device for the uplink synchronization information and/or the uplink resource through its own random access process is avoided, and signaling interactions for acquisition of the uplink synchronization information and/or the uplink resource between the second UE and the network device are reduced to reduce a signaling overhead for acquisition of the uplink synchronization information between the second UE and the network device.

Optionally, as an embodiment, the operation that the network device receives the random access request sent by the first UE includes that: the network device receives the random access request sent by the first UE, the random access request being used to request for the uplink resource for the first UE and/or the second UE; and the operation that the network device sends the random access response to the first UE includes that: the network device sends the random access response to the first UE, the random access response being used to indicate the uplink resource adopted by the first UE and/or the second UE to communicate with the network device.

Optionally, as an embodiment, the operation that the network device receives the random access request sent by the first UE, the random access request being used to request for the uplink resource for the first UE and/or the second UE, includes that: the network device receives the random access request sent by the UE through a first physical random access resource, the random access request sent through the first physical random access resource being used to request for the uplink resource for the first UE and/or the second UE.

Optionally, as an embodiment, the method further includes that: the network device receives resource request information sent by the first UE, the resource request information being used to request for the uplink resource for the first UE and/or the second UE.

Optionally, as an embodiment, the operation that the network device receives the resource request information sent by the first UE includes that: the network device receives a connection establishment request sent by the first UE, the connection establishment request being used to request the network device to establish a connection with the first UE and the connection establishment request carrying the resource request information.

Optionally, as an embodiment, the operation that the network device receives the resource request information sent by the first UE includes that: the network device receives connection establishment completion sent by the first UE, connection establishment completion being used to indicate that connection establishment between the first UE and the network device has been completed and connection establishment completion carrying the resource request information.

Optionally, as an embodiment, the operation that the network device receives the resource request information sent by the first UE includes that: the network device receives reconfiguration completion sent by the first UE, reconfiguration completion being used to indicate that resource reconfiguration between the first UE and the network device has been completed and reconfiguration completion carrying the resource request information.

Optionally, as an embodiment, the random access request is configured to request for the uplink resource for the second UE, and the method further includes that: the network device sends resource indication information to the second UE, the indication information being used to indicate the uplink resource adopted by the second UE to communicate with the network device.

Optionally, as an embodiment, the first UE is a relay UE and the second UE is a remote UE; or the first UE is a remote UE and the second UE is a relay UE.

Optionally, as an embodiment, the uplink synchronization information includes a TA adopted by the first UE and/or the second UE to communicate with the network device.

The random access method of the embodiments of the disclosure are described above in combination with FIG. 1 to FIG. 7 in detail. A random access device of the embodiments of the disclosure will be described below in combination with FIG. 8 to FIG. 11 in detail. It is to be understood that the device shown in FIG. 8 to FIG. 11 may implement each operation in FIG. 3 and will not be elaborated herein for avoiding repetitions.

Figure 8:
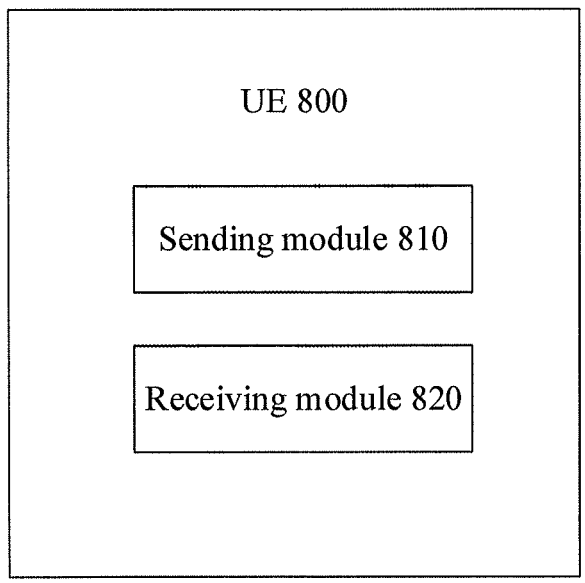
FIG. 8 is a schematic block diagram of a UE according to an embodiment of the disclosure.

FIG. 8 is a schematic block diagram of a UE according to an embodiment of the disclosure. The UE 800 shown in FIG. 8 includes a sending module 810 and a receiving module 820.

The sending module is configured to send a random access request to a network device.

The receiving module is configured to receive a random access response sent by the network device.

The sending module is further configured to send uplink synchronization information and/or an uplink resource to a second UE, the uplink synchronization information being used for first UE and/or the second UE to perform uplink synchronization with the network device and the uplink resource being used for the first UE and/or the second UE to communicate with the network device.

Optionally, as an embodiment, the uplink synchronization information is configured for the second UE to perform uplink synchronization with the network device; the receiving module is specifically configured to receive the random access response sent by the network device, the random access response carrying first uplink synchronization information and the first uplink synchronization information being used for the first UE to perform uplink synchronization with the network device; and the sending module is specifically configured to determine the uplink synchronization information according to the first uplink synchronization information and send the uplink synchronization information to the second UE.

Optionally, as an embodiment, the uplink synchronization information is configured for the first UE to perform uplink synchronization with the network device, and the sending module is specifically configured to send the uplink synchronization information to the second UE to enable the second UE to perform uplink synchronization with the network device by using the uplink synchronization information.

Optionally, as an embodiment, the sending module is further specifically configured to send the random access request to the network device, the random access request being used to request for the uplink resource for the first UE and/or the second UE; and the receiving module is specifically configured to receive the random access response sent by the network device, the random access response being used to indicate the uplink resource adopted by the first UE and/or the second UE to communicate with the network device.

Optionally, as an embodiment, the sending module is further specifically configured to send, by the first UE, the random access request to the network device through a first physical random access resource, the random access request sent through the first physical random access resource being used to request for the uplink resource for the first UE and/or the second UE.

Optionally, as an embodiment, the sending module is further configured to send resource request information to the network device, the resource request information being used to request for the uplink resource for the first UE and/or the second UE.

Optionally, as an embodiment, the sending module is further specifically configured to send a connection establishment request to the network device, the connection establishment request being used to request the network device to establish a connection with the first UE and the connection establishment request carrying the resource request information.

Optionally, as an embodiment, the sending module is further configured to send connection establishment completion to the network device, connection establishment completion being used to indicate that connection establishment between the first UE and the network device has been completed and connection establishment request carrying the resource request information.

Optionally, as an embodiment, the sending module is further configured to send reconfiguration completion to the network device, reconfiguration completion being used to indicate that resource reconfiguration between the first UE and the network device has been completed and reconfiguration completion carrying the resource request information.

Optionally, as an embodiment, the sending module is further configured to send indication information to the second UE, the indication information being used to indicate the uplink resource adopted by the second UE to communicate with the network device.

Optionally, as an embodiment, the first UE is a relay UE and the second UE is a remote UE; or the first UE is a remote UE and the second UE is a relay UE.

Optionally, as an embodiment, the uplink synchronization information includes a TA adopted by the first UE and/or the second UE to communicate with the network device.

Figure 9:
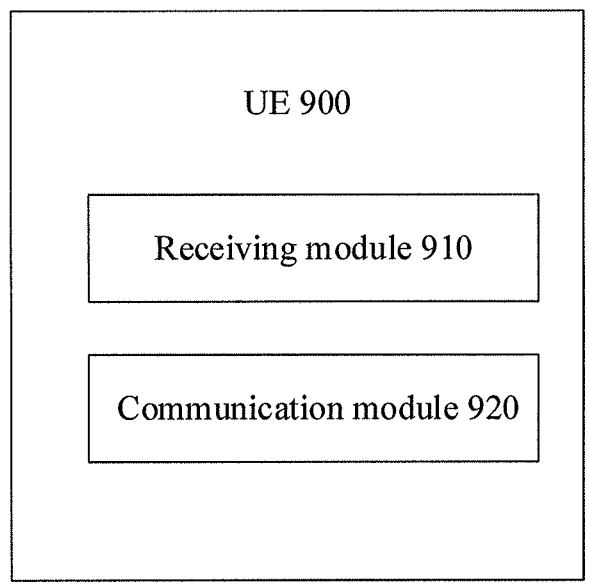
FIG. 9 is a schematic block diagram of a UE according to an embodiment of the disclosure.

FIG. 9 is a schematic block diagram of a UE according to an embodiment of the disclosure. The UE 900 shown in FIG. 9 includes a receiving module 910 and a communication module 920.

The receiving module is configured to receive uplink synchronization information and/or uplink resource sent by a first UE, the uplink synchronization information being used for the first UE and/or second UE to perform uplink synchronization with a network device and the uplink resource being used for the first UE and/or the second UE to communicate with the network device.

The communication module is configured to perform communication with the network device according to the uplink synchronization information and/or the uplink resource.

Optionally, as an embodiment, the receiving module is further configured to receive indication information sent by the first UE, the indication information being used to indicate the uplink resource adopted by the second UE to communicate with the network device and the uplink resource indicated by the indication information being determined by the first UE through a random access process.

Optionally, as an embodiment, the UE further includes a receiving module, configured to receive resource indication information sent by the network device, the resource indication information being used to indicate the uplink resource adopted by the second UE to communicate with the network device and the uplink resource indicated by the resource indication information being requested by the first UE through a random access process.

Optionally, as an embodiment, the first UE is a relay UE and the second UE is a remote UE; or the first UE is a remote UE and the second UE is a relay UE.

Optionally, as an embodiment, the uplink synchronization information includes a TA adopted by the first UE and/or the second UE to communicate with the network device.

Figure 10:
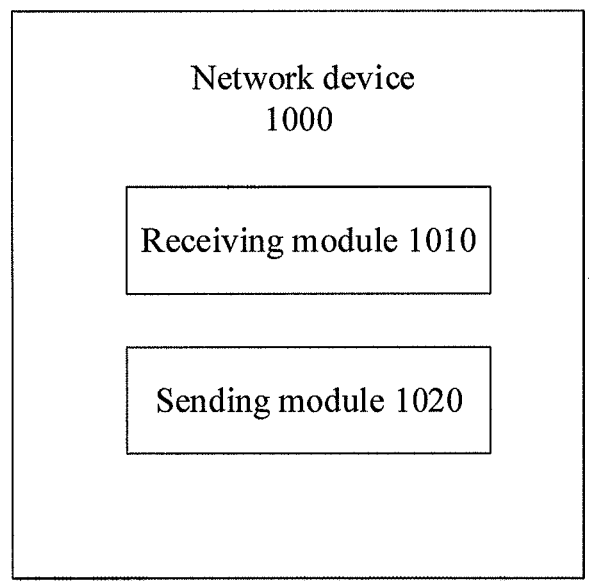
FIG. 10 is a schematic block diagram of a network device according to an embodiment of the disclosure.

FIG. 10 is a schematic block diagram of a network device according to an embodiment of the disclosure. The network device 1000 shown in FIG. 10 includes a receiving module 1010 and a sending module 1020.

The receiving module is configured to receive a random access request sent by a first UE.

The sending module is configured to send a random access response to the first UE to enable the first UE to send uplink synchronization information and/or an uplink resource to a second UE, the uplink synchronization information being used for the first UE and/or the second UE to perform uplink synchronization with the network device and the uplink resource being used for the first UE and/or the second UE to communicate with the network device.

Optionally, as an embodiment, the uplink synchronization information is configured for the second UE to perform uplink synchronization with the network device; and the sending module is further specifically configured to send the random access response to the first UE, the random access response carrying first uplink synchronization information and the first uplink synchronization information being used for the first UE to perform uplink synchronization with the network device, to enable the first UE to determine the uplink synchronization information according to the first uplink synchronization information.

Optionally, as an embodiment, the sending module is further specifically configured to receive the random access request sent by the first UE, the random access request being used to request for the uplink resource for the first UE and/or the second UE; and the sending module is further specifically configured to send the random access response to the first UE, the random access response being used to indicate the uplink resource adopted by the first UE and/or the second UE to communicate with the network device.

Optionally, as an embodiment, the receiving module is specifically configured to receive the random access request sent by the UE through a first physical random access resource, the random access request sent through the first physical random access resource being used to request for the uplink resource for the first UE and/or the second UE.

Optionally, as an embodiment, the receiving module is specifically configured to receive resource request information sent by the first UE, the resource request information being used to request for the uplink resource for the first UE and/or the second UE.

Optionally, as an embodiment, the receiving module is specifically configured to receive a connection establishment request sent by the first UE, the connection establishment request being used to request the network device to establish a connection with the first UE and the connection establishment request carrying the resource request information.

Optionally, as an embodiment, the receiving module is specifically configured to receive connection establishment completion sent by the first UE, connection establishment completion being used to indicate that connection establishment between the first UE and the network device has been completed and connection establishment request carrying the resource request information.

Optionally, as an embodiment, the receiving module is specifically configured to receive reconfiguration completion sent by the first UE, reconfiguration completion being used to indicate that resource reconfiguration between the first UE and the network device has been completed and reconfiguration completion carrying the resource request information.

Optionally, as an embodiment, the random access request is configured to request for the uplink resource for the second UE, and the sending module is specifically configured to send resource indication information to the second UE, the indication information being used to indicate the uplink resource adopted by the second UE to communicate with the network device.

Optionally, as an embodiment, the first UE is a relay UE and the second UE is a remote UE; or the first UE is a remote UE and the second UE is a relay UE.

Optionally, as an embodiment, the uplink synchronization information includes a TA adopted by the first UE and/or the second UE to communicate with the network device.

Figure 11:
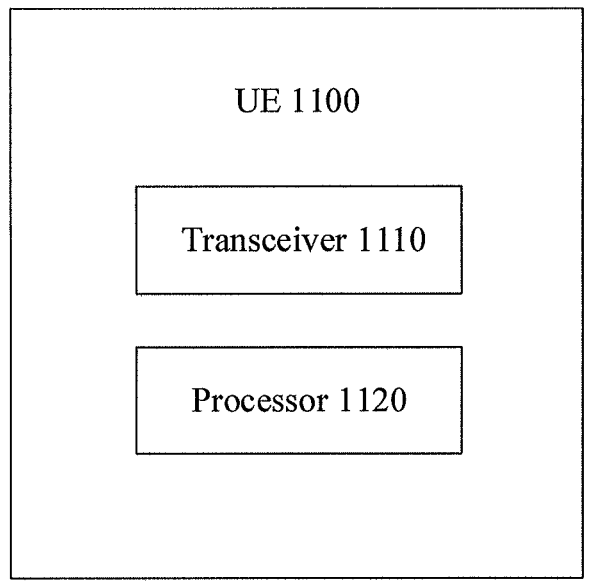
FIG. 11 is a schematic block diagram of a UE according to an embodiment of the disclosure.

FIG. 11 is a schematic block diagram of a UE according to an embodiment of the disclosure. The UE 1100 in FIG. 11 includes a transceiver 1110 and a processor 1120.

The transceiver 1110 is configured to send a random access request to a network device, and is further configured to send uplink synchronization information and/or an uplink resource to a second UE, the uplink synchronization information being used for the first UE and/or the second UE to perform uplink synchronization with the network device and the uplink resource being used for the first UE and/or the second UE to communicate with the network device.

The processor 1120 is configured to execute a program.

Optionally, as an embodiment, the uplink synchronization information is configured for the second UE to perform uplink synchronization with the network device; the transceiver is specifically configured to receive the random access response sent by the network device, the random access response carrying first uplink synchronization information and the first uplink synchronization information being used for the first UE to perform uplink synchronization with the network device; and the transceiver is specifically configured to determine the uplink synchronization information according to the first uplink synchronization information and send the uplink synchronization information to the second UE.

Optionally, as an embodiment, the uplink synchronization information is configured for the first UE to perform uplink synchronization with the network device, and the transceiver is specifically configured to send the uplink synchronization information to the second UE to enable the second HE to perform uplink synchronization with the network device by using the uplink synchronization information.

Optionally, as an embodiment, the transceiver is further specifically configured to send the random access request to the network device, the random access request being used to request for the uplink resource for the first UE and/or the second UE; and the transceiver is specifically configured to receive the random access response sent by the network device, the random access response being used to indicate the uplink resource adopted by the first UE and/or the second UE to communicate with the network device.

Optionally, as an embodiment, the transceiver is further specifically configured for the first UE to send the random access request to the network device through a first physical random access resource, the random access request sent through the first physical random access resource being used to request for the uplink resource for the first UE and/or the second UE.

Optionally, as an embodiment, the transceiver is further configured to send resource request information to the network device, the resource request information being used to request for the uplink resource for the first UE and/or the second UE.

Optionally, as an embodiment, the transceiver is further specifically configured to send a connection establishment request to the network device, the connection establishment request being used to request the network device to establish a connection with the first UE and the connection establishment request carrying the resource request information.

Optionally, as an embodiment, the transceiver is further configured to send connection establishment completion to the network device, connection establishment completion being used to indicate that connection establishment between the first UE and the network device has been completed and connection establishment completion carrying the resource request information.

Optionally, as an embodiment, the transceiver is further configured to send reconfiguration completion to the network device, reconfiguration completion being used to indicate that resource reconfiguration between the first UE and the network device has been completed and reconfiguration completion carrying the resource request information.

Optionally, as an embodiment, the transceiver is further configured to send indication information to the second UE, the indication information being used to indicate the uplink resource adopted by the second UE to communicate with the network device.

Optionally, as an embodiment, the first UE is a relay UE and the second UE is a remote UE; or the first UE is a remote UE and the second UE is a relay UE.

Optionally, as an embodiment, the uplink synchronization information includes a TA adopted by the first UE and/or the second UE to communicate with the network device.

Figure 12:
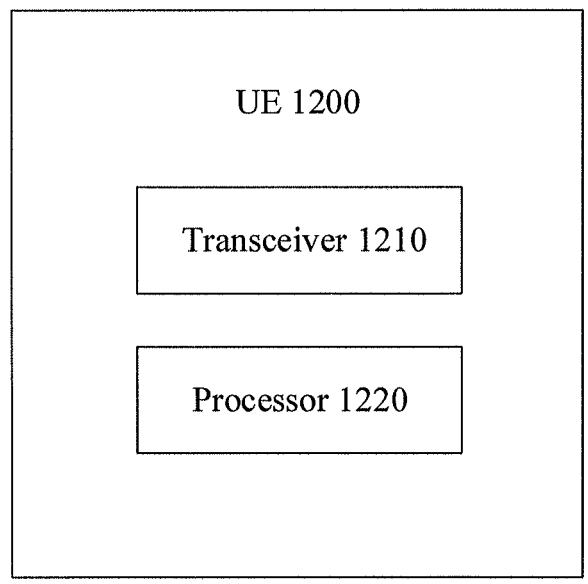
FIG. 12 is a schematic block diagram of a UE according to an embodiment of the disclosure.

FIG. 12 is a schematic block diagram of a UE according to an embodiment of the disclosure. The UE 1200 in FIG. 12 includes a transceiver 1210 and a processor 1220.

The transceiver is configured to receive uplink synchronization information and/or uplink resource sent by a first UE, the uplink synchronization information being used for the first UE and/or the second UE to perform uplink synchronization with a network device and the uplink resource being used for the first UE and/or the second UE to communicate with the network device, and is further configured to perform communication with the network device according to the uplink synchronization information and/or the uplink resource.

The processor is configured to execute a program.

Optionally, as an embodiment, the transceiver is further configured to receive indication information sent by the first UE, the indication information being used to indicate the uplink resource adopted by the second UE to communicate with the network device and the uplink resource indicated by the indication information being determined by the first UE through a random access process.

Optionally, as an embodiment, the UE further includes a transceiver, configured to receive resource indication information sent by the network device, the resource indication information being used to indicate the uplink resource adopted by the second UE to communicate with the network device and the uplink resource indicated by the resource indication information being requested by the first UE through a random access process.

Optionally, as an embodiment, the first UE is a relay UE and the second UE is a remote UE; or the first UE is a remote UE and the second UE is a relay UE.

Optionally, as an embodiment, the uplink synchronization information includes a TA adopted by the first UE and/or the second UE to communicate with the network device.

Figure 13:
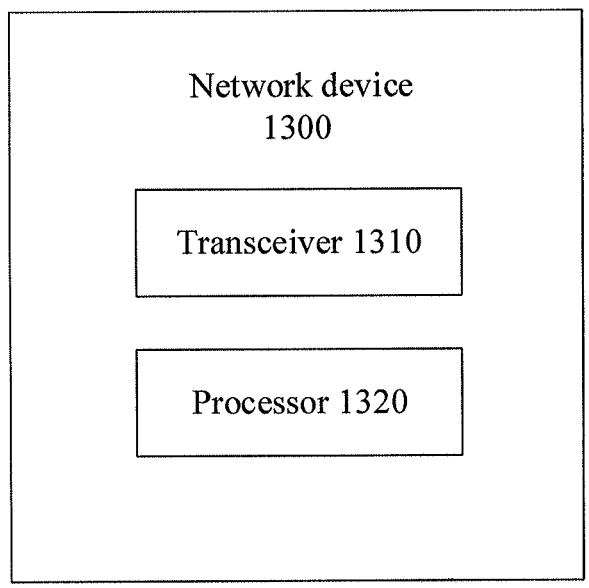
FIG. 13 is a schematic block diagram of a network device according to an embodiment of the disclosure.

FIG. 13 is a schematic block diagram of a network device according to an embodiment of the disclosure. The network device 1300 in FIG. 13 includes a transceiver 1310 and a processor 1320.

The transceiver is configured to receive a random access request sent by a first UE, and is configured to send a random access response to the first UE to enable the first UE to send uplink synchronization information and/or an uplink resource to a second UE, the uplink synchronization information being used for the first UE and/or the second UE to perform uplink synchronization with the network device and the uplink resource being used for the first UE and/or the second UE to communicate with the network device.

Optionally, as an embodiment, the uplink synchronization information is configured for the second UE to perform uplink synchronization with the network device; and the transceiver is further specifically configured to send the random access response to the first UE, the random access response carrying first uplink synchronization information and the first uplink synchronization information being used for the first UE to perform uplink synchronization with the network device, to enable the first UE to determine the uplink synchronization information according to the first uplink synchronization information.

Optionally, as an embodiment, the transceiver is further specifically configured to receive the random access request sent by the first UE, the random access request being used to request for the uplink resource for the first UE and/or the second UE; and the transceiver is further specifically configured to send the random access response to the first UE, the random access response being used to indicate the uplink resource adopted by the first UE and/or the second UE to communicate with the network device.

Optionally, as an embodiment, the transceiver is specifically configured to receive the random access request sent by the UE through a first physical random access resource, the random access request sent through the first physical random access resource being used to request for the uplink resource for the first UE and/or the second UE.

Optionally, as an embodiment, the transceiver is specifically configured to receive resource request information sent by the first UE, the resource request information being used to request for the uplink resource for the first UE and/or the second UE.

Optionally, as an embodiment, the transceiver is specifically configured to receive a connection establishment request sent by the first UE, the connection establishment request being used to request the network device to establish a connection with the first UE and the connection establishment request carrying the resource request information.

Optionally, as an embodiment, the transceiver is specifically configured to receive connection establishment completion sent by the first UE, connection establishment completion being used to indicate that connection establishment between the first UE and the network device has been completed and connection establishment request carrying the resource request information.

Optionally, as an embodiment, the transceiver is specifically configured to receive reconfiguration completion sent by the first UE, reconfiguration completion being used to indicate that resource reconfiguration between the first UE and the network device has been completed and reconfiguration completion carrying the resource request information.

Optionally, as an embodiment, the random access request is configured to request for the uplink resource for the second UE, and the transceiver is specifically configured to send resource indication information to the second UE, the indication information being used to indicate the uplink resource adopted by the second UE to communicate with the network device.

Optionally, as an embodiment, the first UE is a relay UE and the second UE is a remote UE; or the first UE is a remote UE and the second UE is a relay UE.

Optionally, as an embodiment, the uplink synchronization information includes a TA adopted by the first UE and/or the second UE to communicate with the network device.

It is to be understood that, in the embodiments of the disclosure, "B corresponding to A" represents that B is associated with A and B may be determined according to A. It is also to be understood that determining B according to A does not mean that B is determined only according to A and B may also be determined according to A and/or other information.

It is to be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

The embodiments may be implemented completely or partially through software, hardware, firmware or any combination thereof. During implementation with the software, the embodiments may be implemented completely or partially in form of computer program product. The computer program product includes one or more computer instructions. When the computer program instruction is loaded and executed on a computer, the flows or functions according to the embodiments of the disclosure are completely or partially generated. The computer may be a universal computer, a dedicated computer, a computer network or another programmable device. The computer instruction may be stored in a computer-readable storage medium or transmitted from one computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium readable for the computer or a data storage device, such as a server and a data center, including one or more integrated available media. The available medium may be a magnetic medium (for example, a floppy disk, a hard disk and a magnetic tape), an optical medium (for example, a Digital Video Disc (DVD)), a semiconductor medium (for example, a Solid State Disk (SSD)) or the like.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A random access method, comprising:
   sending, by a first User Equipment (UE), a random access request to a network device;
   receiving, by the first UE, a random access response sent by the network device; and
   sending, by the first UE, at least one of uplink synchronization information or an uplink resource to a second UE, the uplink synchronization information being used for the second UE to perform uplink synchronization with the network device, and the uplink resource being used for at least one of the first UE or the second UE to communicate with the network device;
   wherein receiving, by the first UE, the random access response sent by the network device comprises:
   receiving, by the first UE, the random access response sent by the network device, the random access response carrying first uplink synchronization information, and the first uplink synchronization information being used for the first UE to perform uplink synchronization with the network device; and
   wherein sending, by the first UE, at least one of the uplink synchronization information or the uplink resource to the second UE comprises:
   determining, by the first UE, the uplink synchronization information according to the first uplink synchronization information; and
   sending, by the first UE, the uplink synchronization information to the second UE.

2. The method of claim 1, wherein sending, by the first UE, the random access request to the network device comprises:
   sending, by the first UE, the random access request to the network device, the random access request being used to request for the uplink resource for at least one of the first UE or the second UE; and
   receiving, by the first UE, the random access response sent by the network device comprises:
   receiving, by the first UE, the random access response sent by the network device, the random access response being used to indicate the uplink resource adopted by at least one of the first UE or the second UE to communicate with the network device.

3. The method of claim 2, wherein sending, by the first UE, the random access request to the network device, the random access request being used to request for the uplink resource for at least one of the first UE or the second UE, comprises:
   sending, by the first UE, the random access request to the network device through a first physical random access resource, the random access request sent through the first physical random access resource being used to request for the uplink resource for at least one of the first UE or the second UE.

4. The method of claim 1, further comprising:
sending, by the first UE, resource request information to the network device, the resource request information being used to request for the uplink resource for at least one of the first UE or the second UE,
wherein sending, by the first UE, the resource request information to the network device comprises: sending, by the first UE, a connection establishment request to the network device, the connection establishment request being used to request the network device to establish a connection with the first UE, and the connection establishment request carrying the resource request information,
or wherein sending, by the first UE, the resource request information to the network device comprises: sending, by the first UE, connection establishment completion to the network device, connection establishment completion being used to indicate that connection establishment between the first UE and the network device has been completed and connection establishment request carrying the resource request information,
or wherein sending, by the first UE, the resource request information to the network device comprises: sending, by the first UE, reconfiguration completion to the network device, reconfiguration completion being used to indicate that resource reconfiguration between the first UE and the network device has been completed and reconfiguration completion carrying the resource request information.

5. The method of claim 1, further comprising:
sending, by the first UE, indication information to the second UE, the indication information being used to indicate the uplink resource adopted by the second UE to communicate with the network device.

6. The method of claim 1, wherein the first UE is a relay UE and the second UE is a remote UE; or the first UE is a remote UE and the second UE is a relay UE.

7. A random access method, comprising:
receiving, by a second User Equipment (UE), at least one of uplink synchronization information or uplink resource sent by a first UE, the uplink synchronization information being used for the second UE to perform uplink synchronization with a network device, and the uplink resource being used for at least one of the first UE or the second UE to communicate with the network device; and
performing, by the second UE, communication with the network device according to at least one of the uplink synchronization information or the uplink resource
wherein the method further comprises:
receiving, by the second UE, indication information sent by the first UE, the indication information being used to indicate the uplink resource adopted by the second UE to communicate with the network device, and the uplink resource indicated by the indication information being determined by the first UE through a random access process.

8. The method of claim 7, wherein the first UE is a relay UE and the second UE is a remote UE; or
the first UE is a remote UE and the second UE is a relay UE.

9. A User Equipment (UE), comprising:
a transceiver, configured to send a random access request to a network device, and receive a random access response sent by the network device, wherein the transceiver is further configured to send at least one of uplink synchronization information or an uplink resource to a second UE, the uplink synchronization information being used for the second UE to perform uplink synchronization with the network device, and the uplink resource being used for at least one of the first UE or the second UE to communicate with the network device;
wherein the transceiver is specifically configured to:
receive the random access response sent by the network device, the random access response carrying first uplink synchronization information, and the first uplink synchronization information being used for the first UE to perform uplink synchronization with the network device; and
wherein the transceiver is specifically configured to:
determine the uplink synchronization information according to the first uplink synchronization information; and
send the uplink synchronization information to the second UE.

10. The UE of claim 9, wherein the transceiver is further specifically configured to:
send the random access request to the network device, the random access request being used to request for the uplink resource for at least one of the first UE or the second UE; and
the transceiver is specifically configured to:
receive the random access response sent by the network device, the random access response being used to indicate the uplink resource adopted by at least one of the first UE or the second UE to communicate with the network device.

11. The UE of claim 10, wherein the transceiver is further specifically configured to:
send, by the first UE, the random access request to the network device through a first physical random access resource, the random access request sent through the first physical random access resource being used to request for the uplink resource for at least one of the first UE or the second UE.

12. The UE of claim 9, wherein the transceiver is further configured to:
send resource request information to the network device, the resource request information being used to request for the uplink resource for at least one of the first UE or the second UE,
wherein the transceiver is further specifically configured to: send a connection establishment request to the network device, the connection establishment request being used to request the network device to establish a connection with the first UE and the connection establishment request carrying the resource request information, or
wherein the transceiver is further configured to: send connection establishment completion to the network device, the connection establishment completion being used to indicate that connection establishment between the first UE and the network device has been completed, and the connection establishment request carrying the resource request information, or
wherein the transceiver is further configured to: send reconfiguration completion to the network device, the reconfiguration completion being used to indicate that resource reconfiguration between the first UE and the network device has been completed, and the reconfiguration completion carrying the resource request information.

13. The UE of claim 9, wherein the transceiver is further configured to:
- send indication information to the second UE, the indication information being used to indicate the uplink resource adopted by the second UE to communicate with the network device.

14. The UE of claim 9, wherein the first UE is a relay UE and the second UE is a remote UE; or
- the first UE is a remote UE and the second UE is a relay UE.

* * * * *